US005760813A

United States Patent [19]

Yamaguchi et al.

[11] Patent Number: 5,760,813

[45] Date of Patent: Jun. 2, 1998

[54] PRINTING METHOD USING DIVISIONAL DOTS AND A PRINTER THEREFOR

[75] Inventors: Masayoshi Yamaguchi; Takaya Nagahata, both of Kyoto, Japan

[73] Assignee: Rohm Co., Ltd., Kyoto, Japan

[21] Appl. No.: 227,333

[22] Filed: Apr. 14, 1994

[30] Foreign Application Priority Data

Apr. 14, 1993 [JP] Japan .................................... 5-087477

[51] Int. Cl.$^{6}$ ............................ B41J 2/355; G01D 15/10; G01D 15/16

[52] U.S. Cl. .............................................................. 347/183

[58] Field of Search .................................. 347/11, 15, 41, 347/183, 188, 190; 400/120.07, 120.09

[56] References Cited

FOREIGN PATENT DOCUMENTS 0191967 10/1984 Japan .

9191967 10/1984 Japan .

*Primary Examiner*—David F. Yockey

*Assistant Examiner*—L. Anderson

*Attorney, Agent, or Firm*—William H. Eilberg

[57] ABSTRACT

A method and a printer are provided for printing on a thermosensitive paper by using a thermal head which has a plurality of heating dots arranged along a line extending in a primary scanning direction. The heating dots are selectively actuated according to sets of printing data for heat generation to form printing dots on the paper. The paper is fed pitch by pitch in a secondary scanning direction substantially perpendicular to the primary scanning direction. Each of the heating dots has a heating length in the primary scanning direction and an effective heating width in the secondary scanning direction, the effective heating width being smaller than the heating length.

5 Claims, 9 Drawing Sheets

PRINTING METHOD USING DIVISIONAL DOTS AND A PRINTER THEREFOR

BACKGROUND OF THE INVENTION

1. Field of the Invention

This invention relates to a method for printing on a thermosensitive paper, as typically adopted for a facsimile machine or thermal printer. The present invention also relates to a printer which can be suitably used for performing such a printing method.

2. Description of the Prior Art

As is well known, a typical line-type thermal printing head comprises an elongate head substrate which is provided with a line of heating dots, and an array of drive IC's for selectively actuating the heating dots. The line of heating dots may be formed by a linear heating resistor which is divided by two different kinds of electrode teeth.

Referring to FIG. 10 of the accompanying drawings, more specifically, a linear heating resistor 3' is electrically connected to a first series of comb-like teeth 6' which extend from a common electrode 5'. The linear resistor 3 is also connected electrically to a second series of comb-like teeth 7' which is arranged in staggered relation to the first series of comb-like teeth 6' and extend from an array of drive ICs (not shown). Thus, the portions of the linear resistor 3' between the first and second series of comb-like teeth 6', 7' work as heating dots arranged in a line.

When it is desired to print on JIS A4-size thermosensitive paper (JIS: Japanese Industrial Standards) with a dot density of 200 dpi (dpi: dots per inch) for example, the linear heating resistor 3' is required to provide 1728 heating dots arranged in a primary scanning direction at a pitch PD of about 130 micrometer, and the paper is also fed at a pitch of about 130 micrometers in a secondary scanning direction which is perpendicular to the primary scanning direction. Further, the heating resistor 3' need have an actual width L1' of about 200 micrometer for example to provide an effective heating width L2' of about 130 micrometers. It should be appreciated here that the effective heating width L2' of the resistor 3' is smaller than the actual width L1' because the resistor 3' inevitably has a tendency to arcuately bulge away from the head substrate (as later described in connection with FIG. 6) due to the surface tension of a resistor material paste (containing mainly ruthenium oxide for example).

FIG. 11 shows a printing dot 15 formed on the thermosensitive paper by a single actuation of each heating dot. As clearly appreciated, the printing dot 15 has a secondary scanning direction width corresponding to the effective heating width L2' (130 micrometers for example) of the linear heating resistor 3'.

According to the prior art described above, each printing dot 15 is formed by a single actuation of a heating dot. In this case, it has been found that the electrical energy necessary for simultaneously actuating all of the heating dots (as sometimes required for facsimile transmission) becomes considerably high, and this tendency becomes more remarkable as the applicable paper size increases. Thus, it is necessary to use an electrical power source of a relatively large capacity for meeting this extreme requirement. Obviously, the incorporation of such a power source into a printer inevitably increases the size of the printer as a whole even if a size reduction of the thermal head itself is realized.

SUMMARY OF THE INVENTION

It is, therefore, an object of the present invention to provide a printing method which eliminates or reduces the disadvantages of the prior art.

Another object of the present invention is to provide a printer which can be advantageously used for performing such a printing method.

According to one aspect of the present invention, there is provided a method of printing on a thermosensitive paper by using a thermal head which has a plurality of heating dots arranged along a line extending in a primary scanning direction, the heating dots being selectively actuated according to sets of printing data for heat generation to form printing dots on the paper, the paper being fed pitch by pitch in a secondary scanning direction substantially perpendicular to the primary scanning direction, each of the printing dots having a predetermined secondary scanning direction width, the method comprising: causing each of actuated heating dots to consecutively form a plurality of divisional dots according to a same set of printing data, each of the divisional dots having a secondary scanning direction width which is smaller than the secondary scanning direction width of said each of the printing dots, the paper being fed by a pitch which is substantially 1/x of the secondary scanning direction width of said each of the printing dots, wherein x is an integer of no less than 2.

The plurality of divisional dots may be formed to partially or slightly overlap each other in the secondary scanning direction. The degree of such an overlap may be adjusted by adjusting the paper feed pitch. Alternatively, the plurality of divisional dots may be formed to adjoin each other.

Preferably, the secondary scanning direction width of each divisional dot may be substantially 1/x of the secondary scanning direction width of each printing dot. Apparently, the electrical energy required for actuating the heating dots can be reduced as the value of x increases.

According to another aspect of the present invention, there is provided a printer for printing on a thermosensitive paper comprising a thermal head which has a plurality of heating dots arranged along a line extending in a primary scanning direction, the heating dots being selectively actuated according to sets of printing data for heat generation to form printing dots on the paper, the paper being fed pitch by pitch in a secondary scanning direction substantially perpendicular to the primary scanning direction, each of the printing dots having a predetermined secondary scanning direction width, wherein each of actuated heating dots is caused to consecutively form a plurality of divisional dots according to a same set of printing data, each of the divisional dots having a secondary scanning direction width which is smaller than the secondary scanning direction width of said each of the printing dots, the paper being fed by a pitch which is substantially 1/x of the secondary scanning direction width of said each of the printing dots, and wherein x is an integer of no less than 2.

Expressed in a different way, the present invention provides a printer for printing on a thermosensitive paper comprising a thermal head which has a plurality of heating dots arranged along a line extending in a primary scanning direction, the heating dots being selectively actuated according to sets of printing data for heat generation to form printing dots on the paper, the paper being fed pitch by pitch in a secondary scanning direction substantially perpendicular to the primary scanning direction, wherein each of the heating dots has a heating length in the primary scanning direction and an effective heating width in the secondary scanning direction, the effective heating width being smaller than the heating length.

It is preferable that the effective heating width of each heating dot is substantially 1/x of the heating length, where x is an integer of no less than 2.

Other objects, features and advantages of the present invention will become apparent from the following detailed description of the preferred embodiments given with reference to the accompanying drawings.

DETAILED DESCRIPTION OF THE PREFERRED EMBODIMENT

Figure 1:
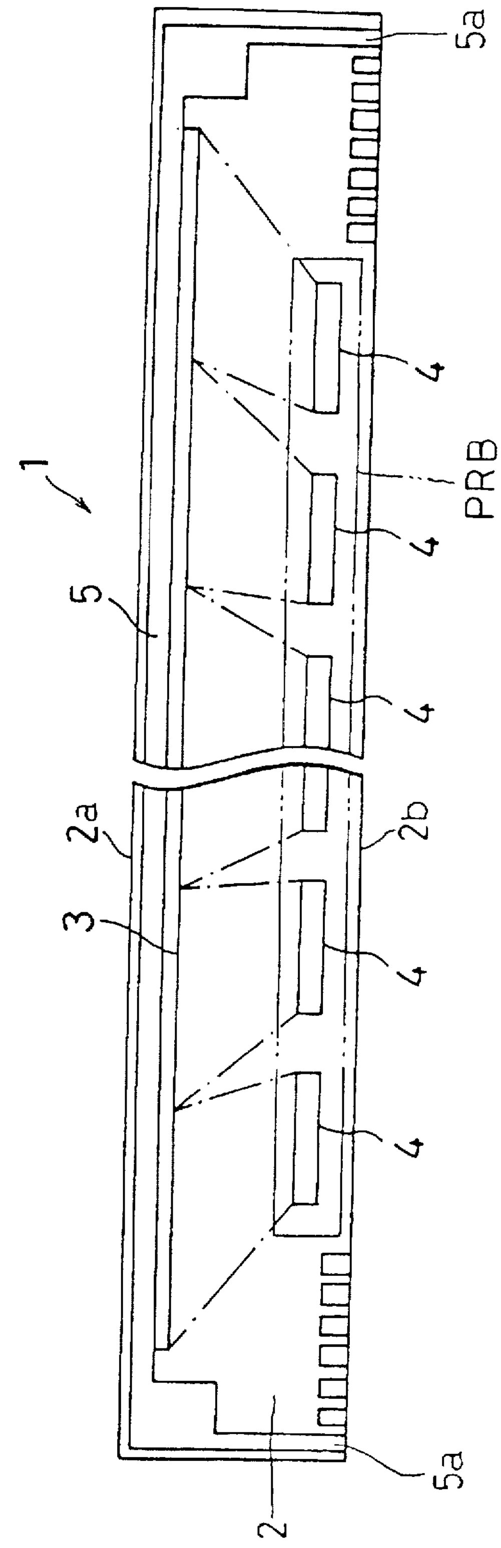
FIG. 1 is a schematic plan view showing a thermal printing head embodying the present invention.

Referring first to FIG. 1 of the accompanying drawings, there is illustrated a thermal printing head according to a preferred embodiment of the present invention. The thermal head generally indicated by reference numeral 1 includes an elongate head substrate 2 which is made of an insulating material such as ceramic. The head substrate 2 has a first longitudinal edge 2*a* and a second longitudinal edge 2*b*.

The head substrate 2 has an upper surface formed with a linear heating resistor 3 extending longitudinally of the substrate along the first longitudinal edge 2*a*, and an array of drive IC's 4 also extending longitudinally of the substrate along the second longitudinal edge 2*b*. The linear resistor 3, which may be made of a thick film, is divisionally heated by the drive IC's 4 to provide a line of heating dots, and each drive IC corresponds to a group which contains a predetermined number of heating dots. The array of drive IC's 4 is enclosed in a protective resin body PRB.

The upper surface of the head substrate 2 is also formed with two groups of connection terminals CT arranged in respective end portions of the substrate adjacent to the second longitudinal edge 2*b*. The upper surface of the head substrate 2 is further formed with a common electrode 5 extending longitudinally of the substrate between the first longitudinal edge 2*a* and the resistor 3. Each end 5*a* of the common electrode 5 extends transversely toward the second longitudinal edge 2*b* to provide a connection terminal in the corresponding terminal group CT.

Figure 2:
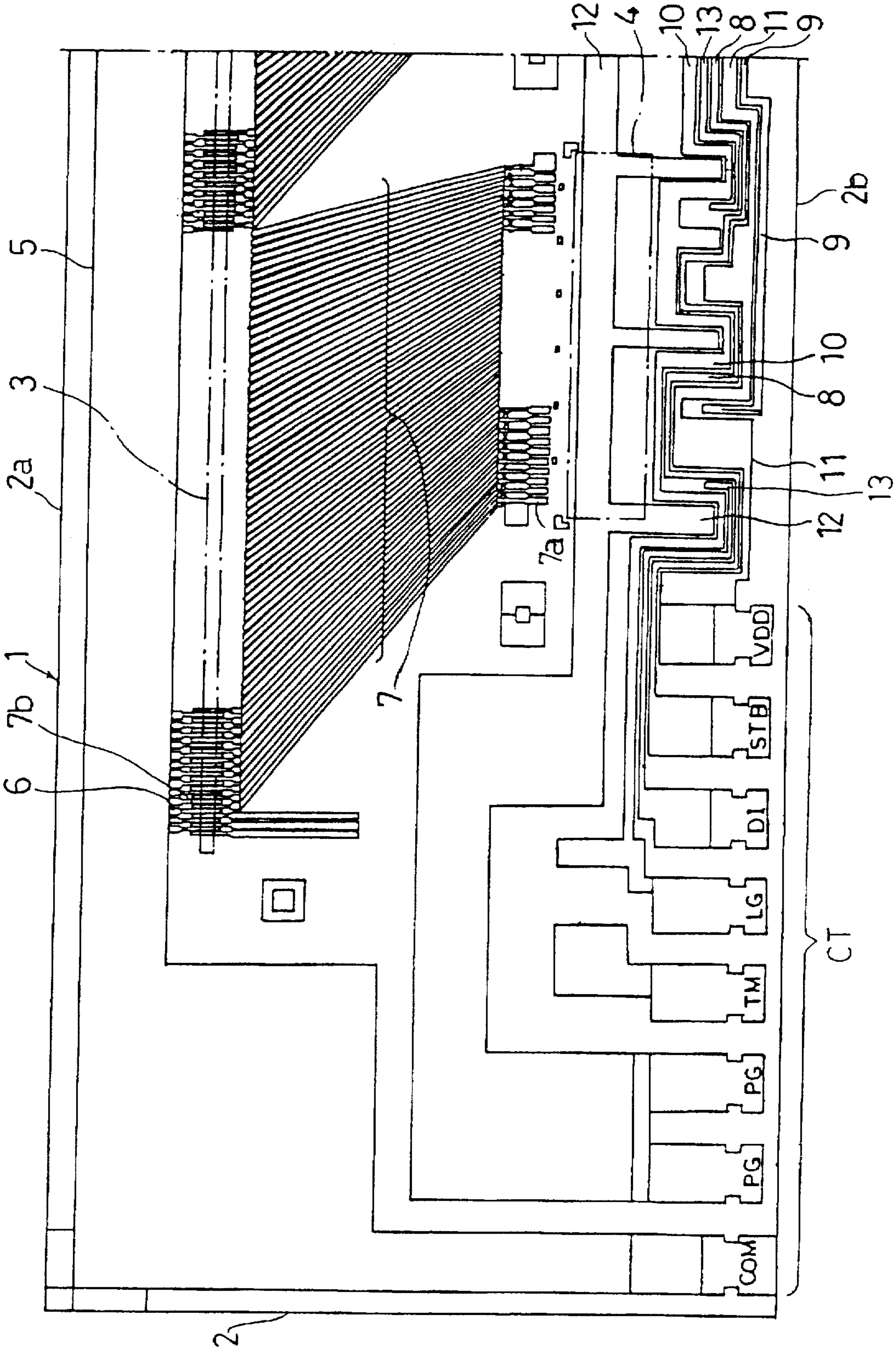
FIG. 2 is a fragmentary plan view showing a left-hand end portion of the printing head.
Figure 3:
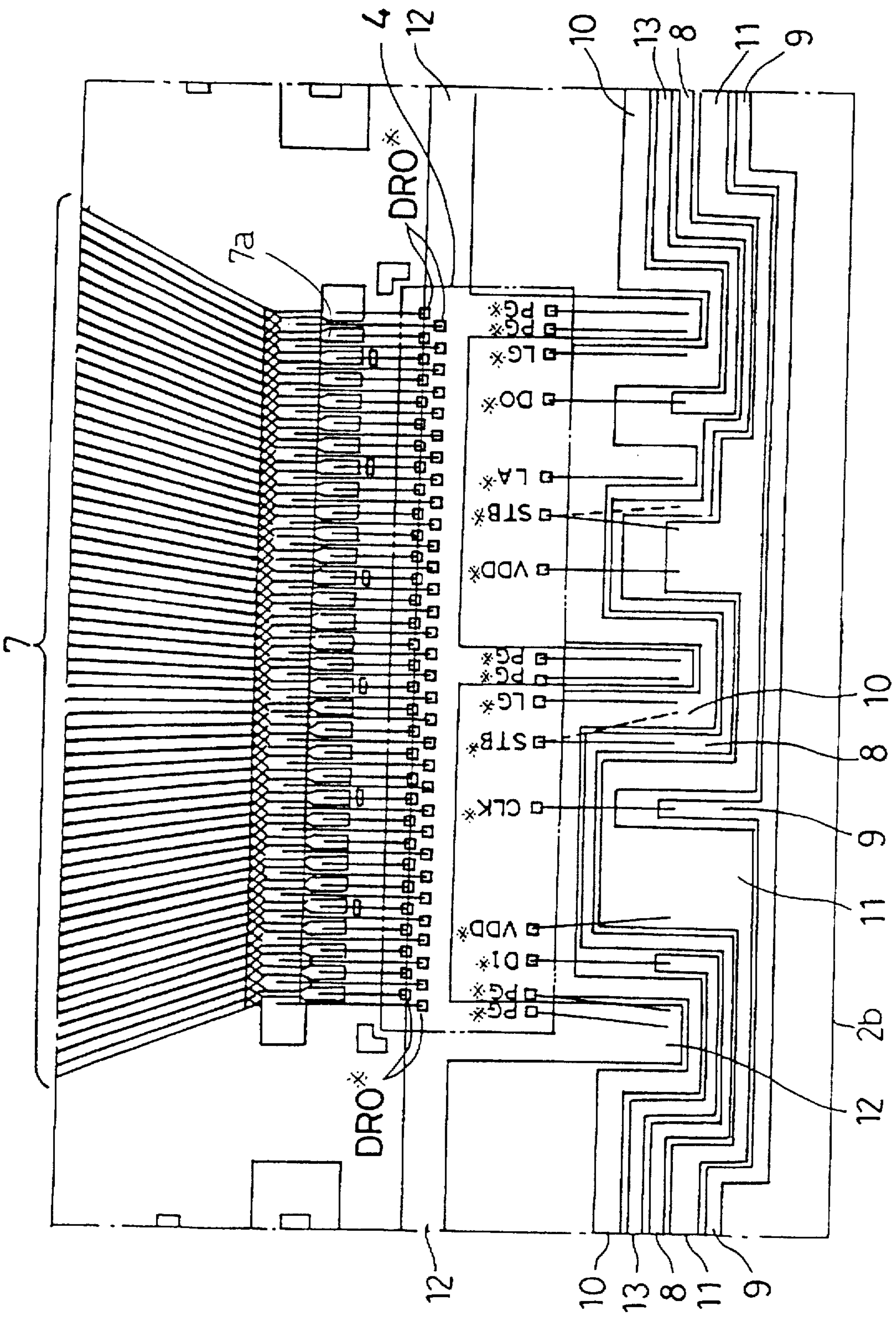
FIG. 3 is a fragmentary plan view showing a central portion of the same head.
Figure 4:
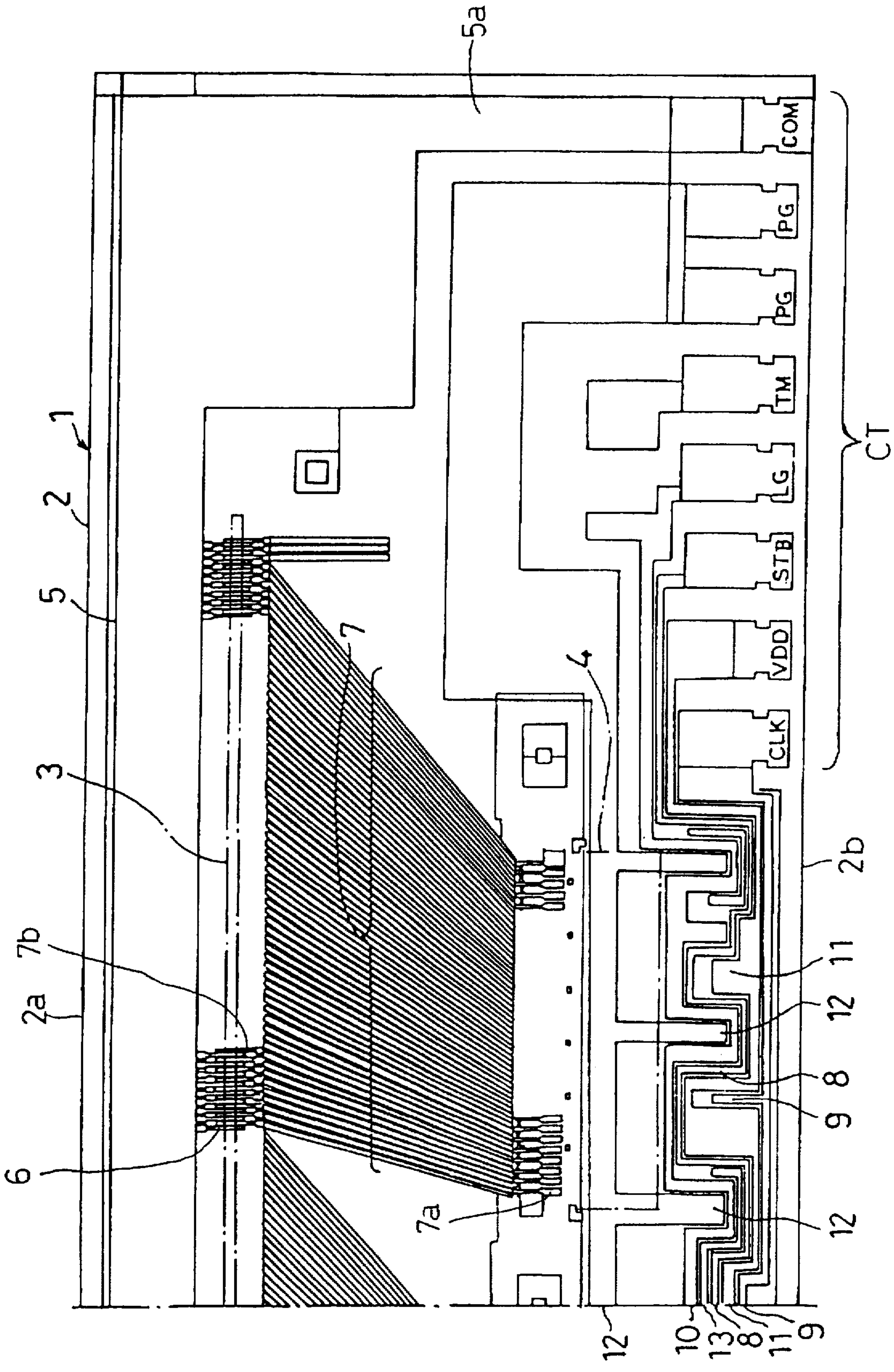
FIG. 4 is a fragmentary plan view showing a right-hand end portion of the same head.

The details of the thermal head 1 or head substrate 2 are illustrated in FIGS. 2–4. FIGS. 2 and 4 show the left-and right-hand end portions, respectively, of the substrate 2, whereas FIG. 3 shows the central portion of the same.

As shown in FIGS. 2–4, groups of wire bonding pads 7*a* are formed on the upper surface of the head substrate 2 adjacent to the respective drive IC's 4 on the side thereof closer to the first longitudinal edge 2*a*. A multiplicity of individual electrodes 7 extend, in a slightly flaring pattern, from the respective groups of wire bonding pads 7*a* to a first series of comb-like teeth 7*b* extending under the heating resistor 3 in crossing relation thereto. A second series of comb-like teeth 6, which also extends under the resistor 3 in crossing relation thereto, are arranged in staggered relation to the first series of comb-like teeth 7*b* and connected to the common electrode 5. Thus, the heating dots are provided by the respective portions of the resistor 3 between the two kinds of comb-like teeth 6, 7*b*.

The heating dots provided by the linear resistor 3 are divided into different groups corresponding to the respective drive IC's 4. As clearly appreciated from FIGS. 2–4, the central drive IC is longitudinally aligned with the central heating dot group (see FIG. 3), whereas the remaining drive IC's are longitudinally offset toward the center of the head substrate 2 relative to the corresponding heating dot groups (see FIGS. 2 and 4).

As shown in FIG. 2, the group of connection terminals CT located in the left-hand end portion of the head substrate 2 include, from left to right, a common terminal COM, two power grounding terminals PG, a thermistor connection terminal TM, a logic grounding terminal LG, a data-in terminal DI, a strobe terminal STB, and a logic power supply terminal VDD. The two power grounding terminals PG are necessary for enabling passage of a sufficient current. These power grounding terminals PG may merge with each other.

As shown in FIG. 4, the group of connection terminals CT located in the right-hand end portion of the head substrate 2 include, from right to left, a common terminal COM, two power grounding terminals PG, a thermistor connection terminal TM, a logic grounding terminal LG, a strobe terminal STB, a logic power supply terminal terminal VDD and a clock terminal CLK.

Each common terminal COM is provided by the corresponding end portion 5*a* of the common electrode 5, as previously described. Each power grounding terminal PG is connected to a power grounding conductor path 12 which extends longitudinally of the head substrate 2 under the respective drive IC's 4.

Each thermistor connection terminal TM is electrically connected to a thermistor (not shown) which is used for monitoring the temperature of the thermal head.

A logic grounding conductor path 10 connected to each logic grounding terminal LG, a data conductor path 13 connected to the data-in terminal DI, a strobe conductor path 8 connected to each strobe terminal STB, and a logic power supply conductor path 11 connected to each logic power supply terminal VDD extend longitudinally of the substrate 2 in parallel to each other. However, these conductor paths 13–16 are formed in a bent or zigzag pattern for circumventing branching portions of the power grounding conductor path 12.

It should be appreciated that the data conductor path 13 is rendered discontinuous at the positions of the respective drive IC's 4. Instead, the data conductor path 13 is connected in series or cascade with the respective drive IC's 4, as more clearly described hereinafter. Thus, the data signals are supplied successively through the array of drive IC's 4 from the single data-in terminal DI.

The single clock terminal CLK (FIG. 4) located in the right-hand end portion of the head substrate 2 is connected to a clock conductor path 9 extending longitudinally of the substrate 2 slightly in a bent pattern. The clock conductor path 9 terminates at the left end drive IC 4.

As represented in FIG. 3, each drive IC 4 has a multiplicity of drive output pads DRO* arranged in two rows adjacent to one longitudinal edge of the drive IC. These output pads are connected to the wire bonding pads 7*a* of the corresponding individual electrodes 7 by wire-bonding.

As also illustrated in FIG. 3, each drive IC 4 further has a plurality of additional pads (including control signal pads) arranged adjacent to the other longitudinal edge of the drive IC. These additional pads include, from left to right, two power grounding pads PG*, a data-in pad DI*, a logic power supply pad VDD*, a clock pad CLK*, a negative logic strobe pad STB*, a logic grounding pad LG*, two additional power grounding pads PG*, another logic power supply pad VDD*, a positive logic strobe pad BEO*, a latch pad LA*, a data-out pad DO*, another logic grounding pad LG*, and two further power grounding pads PG*. These additional pads are connected to the relevant conductor paths 8–13 by wire-bonding, as follows.

The six power grounding pads PG* of each drive IC 4 are wire-bonded to the power grounding conductor path 12. Similarly, the two logic grounding pads LG* are wire-bonded to the logic grounding conductor path 10, whereas the two logic power supply pads VDD* are wire-bonded to the logic power supply conductor path 11. Further, the single clock pad CLK* is wire-bonded to the clock conductor path 9, whereas the single latch pad LA* is wire-bonded to the logic grounding conductor path 10. It should be appreciated that the logic grounding pads LG* and the latch pad LA* are connected to the same logic grounding conductor path 10 because latch signals are not separately supplied. Of course, the latch pad LA* may be connected to a latch signal conductor path (not shown) if latch signals are separately supplied.

As previously described, the data conductor path 13 is rendered discontinuous because the respective drive IC's 4 are connected in cascade by the data conductor path. Thus, the data-in and data-out pads DI*, DO* of each drive IC 4 are wire-bonded to the data conductor path 13 at the point of discontinuity.

In the illustrated embodiment, the conductor paths 8–12 are connected commonly to the respective drive IC's 4 while the data conductor path 13 connects the respective drive IC's 4 in cascade. Thus, the number of the connection terminals CT associated with these conductor paths 8–13 can be sufficiently reduced on the head substrate 2 itself.

Figure 5:
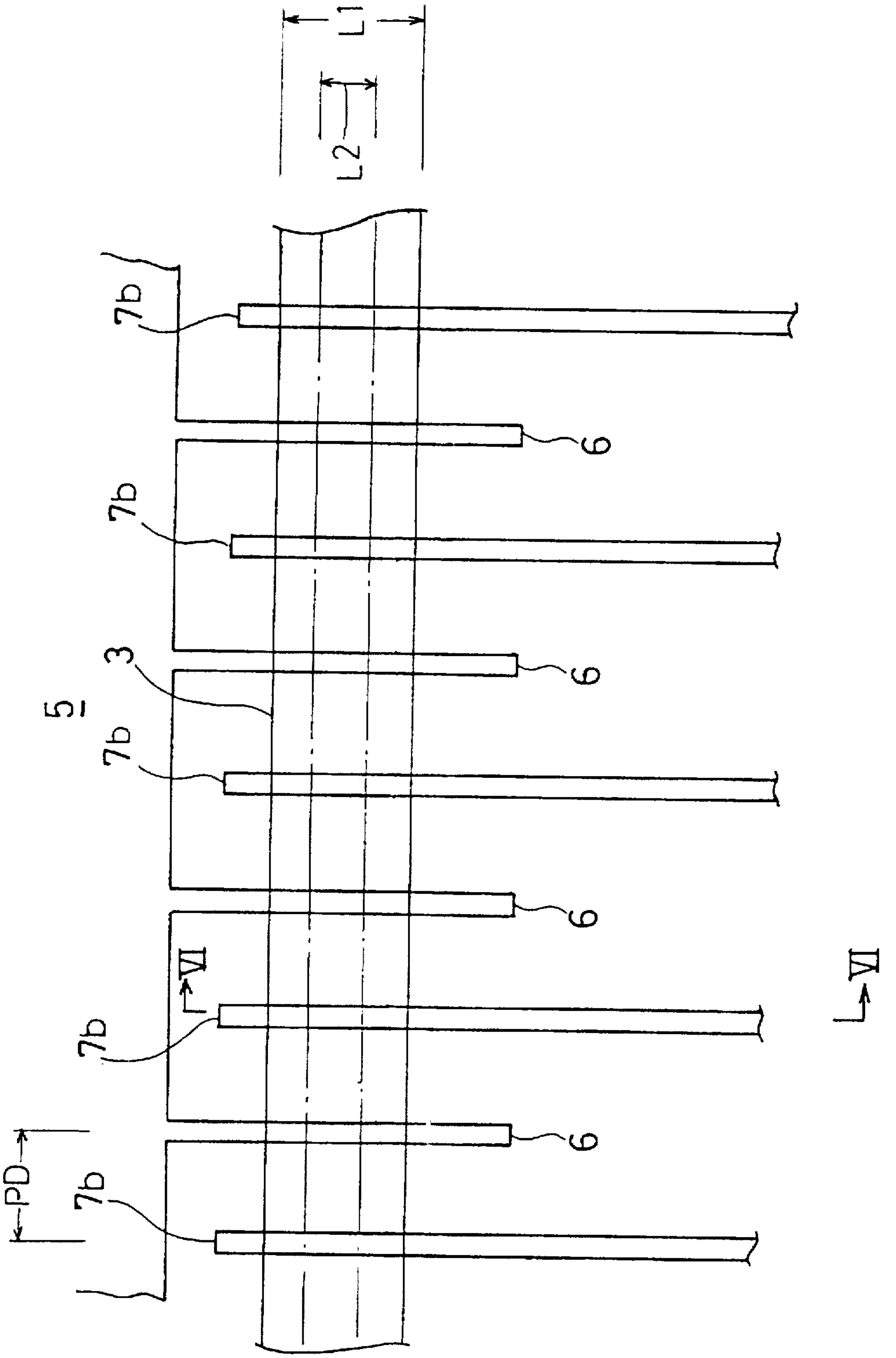
FIG. 5 is an enlarged fragmentary plan view showing a portion of a linear heating resistor incorporated in the thermal head.
Figure 6:
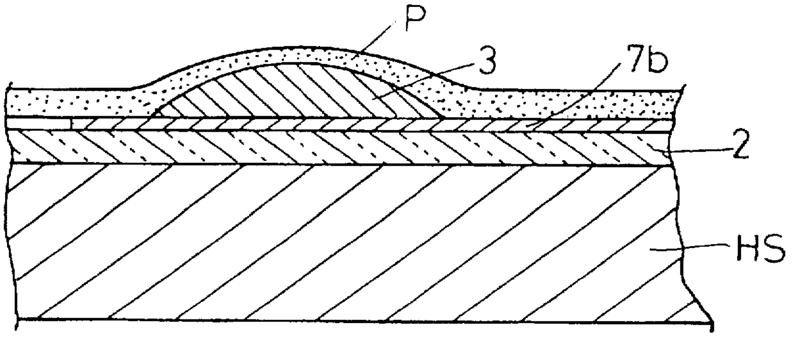
FIG. 6 is a sectional view taken along lines VI—VI in FIG. 5.
Figure 10:
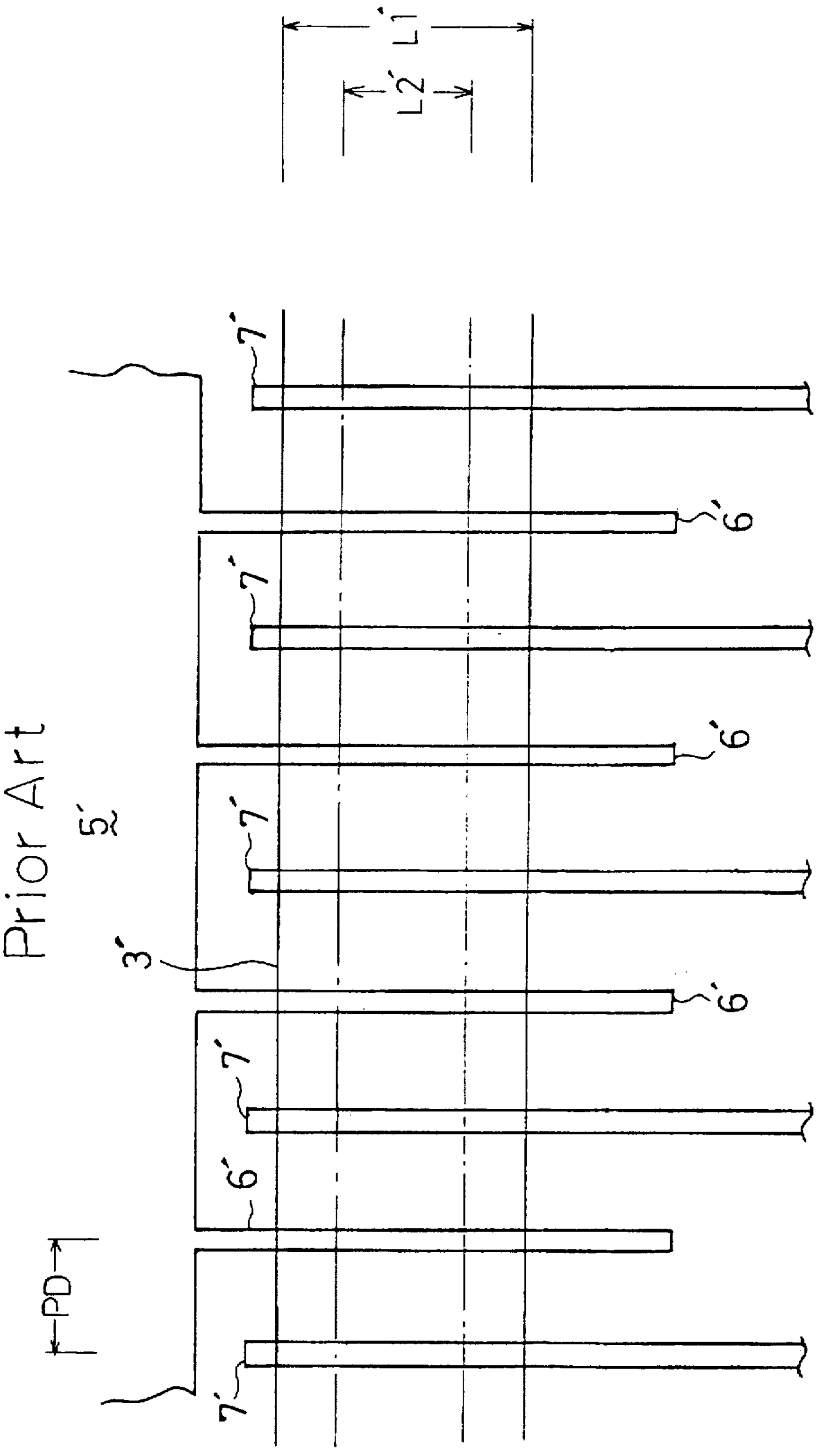
FIG. 10 Prior Art
FIG. 10 is a plan view similar to FIG. 5 but showing a portion of a linear heating resistor in a prior art thermal printing head.

As shown in FIG. 5, the linear heating resistor 3 has an actual width L1 which may be about 100 micrometers when the desired printing dot density is 200 dpi for example, which width is half that of the heating resistor 3' according to the prior art shown in FIG. 10. In this case, the heating resistor 3 is made to have a reduced effective heating width L2 which may be in the range of about 65–80 micrometers for example because the heating resistor 3 has a tendency to arcuately bulge in a direction away from the head substrate 2, as shown in FIG. 6. It should be appreciated that, in FIG. 6, the head substrate 2 is shown to be supported on a heat sink plate HS, whereas the heating resistor 3 is shown to be covered by a protective layer P made of e.g. glass.

On the other hand, the pitch PD between the respective heating dots (which is equal to the pitch between the respective comb-like teeth 6, 7*b*) is kept unchanged in comparison with the prior art shown in FIG. 10. When the desired printing dot density is 200 dpi for example, the pitch PD may be about 130 micrometers. Thus, according to the illustrated embodiment, each of the heating dots is effective for heating only in a rectangular region with the length being generally double the width.

Figure 7:
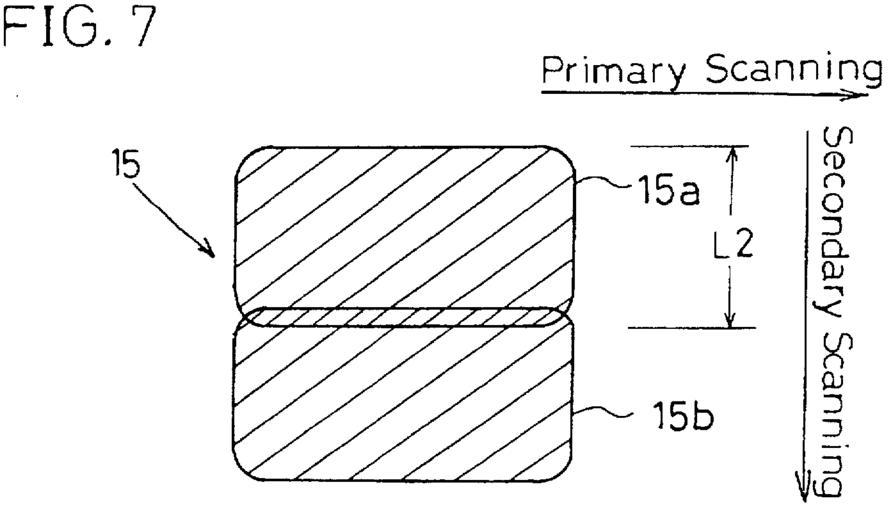
FIG. 7 is a plan view showing a printing dot formed by each printing dot element of the linear heating resistor.

As illustrated in FIG. 7, each printing dot 15 is shown to correspond to two consecutive divisional dots 15*a*, 15*b* which overlap each other only slightly. Each of the consecutive divisional dots 15*a*, 15*b* has a length corresponding generally to the dot pitch PD (e.g. about 130 micrometers) in the primary scanning direction along the linear heating resistor 3 (FIG. 5), and a width corresponding to the effective heating width L2 (e.g. 65–80 micrometers) of the heating resistor 3 in the secondary scanning direction perpendicular to the primary scanning direction. Obviously, the overlap between the consecutive divisional dots 15*a*, 15*b* may be omitted, or the degree of such an overlap may be adjusted depending on the effective heating width L2 of the heating resistor 3.

According to the illustrated embodiment, therefore, each of the heating dots is consecutively actuated twice for forming the two consecutive divisional dots 15*a*, 15*b* corresponding to the single printing dot 15. The paper feed pitch (e.g. 65 micrometers) in the secondary scanning direction is half the dot pitch PD (e.g. about 130 micrometers).

Figure 8:
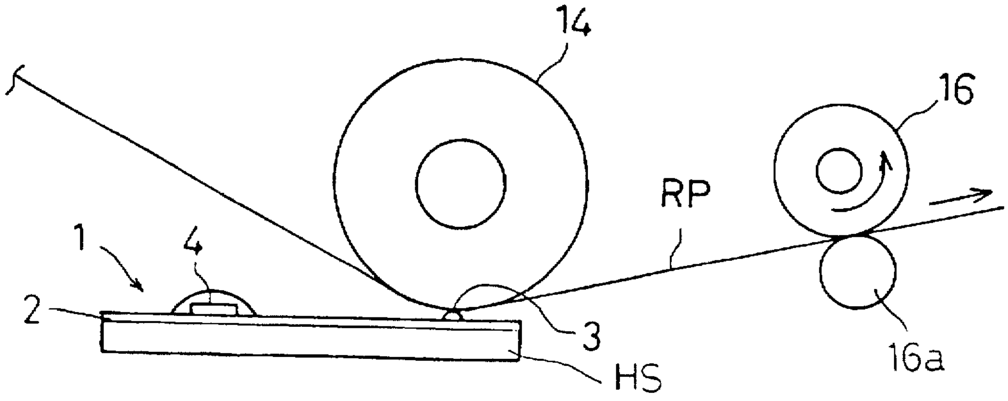
FIG. 8 is a schematic side view showing a printer incorporating the thermal head FIG. 1.

When incorporated into a facsimile machine for example, the heating resistor 3 or the protective layer P (FIG. 6) covering it is held in contact with a thermosensitive paper RP backed up by a platen 14, as shown in FIG. 8. The paper RP is fed forward pitch by pitch by means of a feed roller 16 cooperative with a support roller 16*a*. The feed roller 16 is driven for rotation by a stepping motor (not shown) through a reduction mechanism (not shown).

Figure 9:
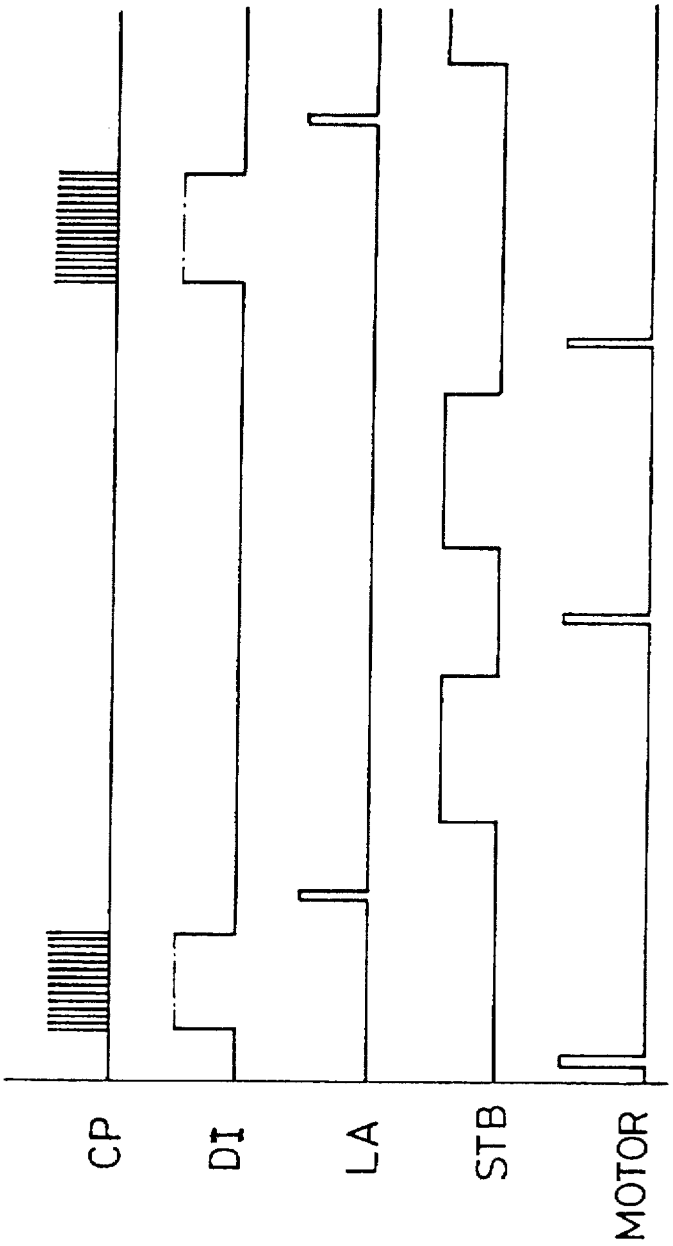
FIG. 9 is a timing chart showing signals for operating the printer shown in FIG. 8.

FIG. 9 shows a timing chart showing signals for controlling the thermal head 1 and the paper feed stepping motor (not shown). In FIG. 9, CP represents clock pulses, whereas DI indicates data-in signals. Further, LA designates latch signals, whereas STB denotes strobe signals. MOTOR represents actuation timing signals for the stepping motor which drives the feed roller 16 (FIG. 8).

When printing on a JIS A4-size paper (JIS: Japanese Industrial Standards), the clock pulses CP include a set of 1728 pulses for example for one printing cycle. A set of data-in signals (printing data signals) DI is serially supplied to the respective drive ICs 4 (FIGS. 1–4) in timed relation to the set of clock pulses CP for storing the printing data in the respective shift registers of the drive ICs. Upon feeding of a latch signal LA, the printing data stored in the shift registers of the respective drive ICs is transferred to the respective latch registers of the drive ICs for holding (latching) the same printing data during the same printing cycle.

In the above condition, a first strobe signal STB (first rise) causes each of selected heating dots along the linear resistor 3 (extending in the primary scanning direction) to be actuated for heat generation, thereby forming a first divisional dot 15*a* (FIG. 7).

Then, a first motor actuation timing signal MOTOR is supplied for causing the thermosensitive paper RP (FIG. 8) to be fed by one pitch (e.g. 65 micrometers) in the secondary scanning direction (FIG. 7).

Then, while holding the same printing data, a second strobe signal STB (second rise) causes each of the same selected heating dots to be actuated for heat generation, thereby forming a second divisional dot 15*b* (FIG. 7). As previously described, the combination of the first and second divisional dots 15*a*, 15*b* forms the single printing dot 15.

Then, another motor actuation signal MOTOR is supplied for causing the paper RP (FIG. 8) to be fed by another one pitch, thereby completing the single cycle of forming each printing dot 15.

In the illustrated embodiment, each of the selected heating dots along the linear heating resistor 3 (extending in the primary scanning direction) is caused to form the two consecutive divisional dots 15*a*, 15*b* (as the single printing dot 15) according to the single set of printing data. Thus, the electrical energy required for forming each divisional dot is approximately halved in comparison with the prior art of FIGS. 10 and 11 wherein each printing dot is formed non-divisionally. As a result, the power source (not shown) for energizing the heating resistor 3 can be reduced in size, thereby realizing a size reduction of the thermal printing head as a whole.

Further, the total current passing through the common electrode 5 can be also reduced due to the above-described reduction of electrical energy. Thus, it is possible to reduce the voltage drop along the common electrode 5, thereby equalizing the heat generation along the linear heating resistor 3 as much as possible to improve the printing quality.

Figure 11:
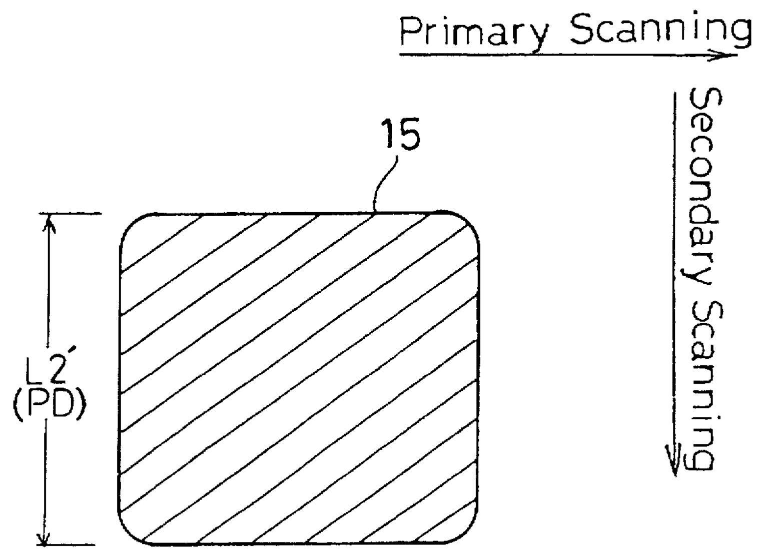
FIG. 11 Prior Art
FIG. 11 is a plan view showing a printing dot formed by each printing dot element of the linear heating resistor of the prior art thermal head.

It should be appreciated that the modifications which need be made to the prior art thermal head of FIGS. 10 and 11 for obtaining the above-described advantages includes only reducing the width of the linear heating resistor and the paper feed pitch. Thus, a drastic design change from the prior art is unnecessary.

According to the illustrated embodiment, each printing dot 15 is provided by the combination of the two divisional dots 15*a*, 15*b* which are consecutive in the secondary scanning direction. However, a modification is possible wherein each printing dot is provided by the combination of three or more consecutive divisional dots.

Expressed in a more general way, the effective heating width L2 of the linear heating resistor 3 is set at 1/x (x: integer of no less than 2) of the width (or more generally "dimension") of each printing dot in the secondary scanning direction, and the paper feed pitch is also set at 1/x of the printing dot width in the secondary scanning direction. Further, the actuation of the heating dots along the linear heating resistor 3 is performed divisionally a plurality of times (x times).

The preferred embodiment of the present invention being thus described, it is obvious that the same may be modified in many ways. For instance, the arrangement of the pads of each drive IC 4 may be optionally modified. Further, the arrangement of the connection terminals CT on the head substrate 2 (FIGS. 2 and 4) as well as the arrangement of the conductor paths 8–13 may be also modified optionally. Such modifications are not to be regarded as a departure from the spirit and scope of the the invention, and all such modifications as would be obvious to those skilled in the art are intended to be included within the scope of the following claims.

We claim:

1. A method of printing on a thermosensitive paper by using a thermal head which has a plurality of heating dots arranged along a line extending in a primary scanning direction, the heating dots being selectively actuated according to sets of printing data for heat generation to form printing dots on the paper, the paper being fed pitch by pitch in a secondary scanning direction perpendicular to the primary scanning direction, each of the printing dots having a predetermined secondary scanning direction width, the method comprising the steps of:

(a) causing each of selected heating dots to form a divisional dot according to a printing data-in signal, each divisional dot having a secondary scanning direction width which is smaller than the secondary scanning direction width of said each of the printing dots;

(b) causing the paper to be fed by a pitch which is substantially 1/x of the secondary scanning direction width of said each of the printing dots, wherein x is an integer of no less than 2; and (c) consecutively repeating the steps (a) and (b) until the paper is fed x times and while said printing data-in signal is held.

2. The method of claim 1, further comprising the step of forming the plurality of divisional dots to partially overlap each other in the secondary scanning direction.

3. The method according to claim 1, wherein the secondary scanning direction width of said each of the divisional dots is substantially 1/x of the secondary scanning direction width of said each of the printing dots.

4. A printer for printing on a thermosensitive paper comprising a thermal head which has a plurality of heating dots arranged along a line extending in a primary scanning direction, means for selectively actuating the heating dots according to sets of printing data for heat generation to form printing dots on the paper, means for feeding the paper pitch by pitch in a secondary scanning direction perpendicular to the primary scanning direction, each of the printing dots having a predetermined secondary scanning direction width, wherein said means for actuating causes each of selected heating dots to consecutively form a plurality of divisional dots according to a same data-in signal, each of the divisional dots having a secondary scanning direction width which is smaller than the secondary scanning direction width of said each of the printing dots, and means for feeding the paper consecutively x times each by a pitch which is substantially 1/x of the secondary scanning direction width of said each of the printing dots while said each of the selected heating dots is consecutively actuated according to said same printing data-in signal, and wherein x is an integer of no less than 2.

5. The apparatus according to claim 4, wherein the secondary scanning direction width of said each of the divisional dots is substantially 1/x of the secondary scanning direction width of said each of the printing dots.

* * * * *